United States Patent
Maier

[19]

[11] Patent Number: 6,141,194
[45] Date of Patent: Oct. 31, 2000

[54] AIRCRAFT FUEL TANK PROTECTIVE BARRIER AND METHOD

[75] Inventor: Lawrence Carl Maier, New Haven, Vt.

[73] Assignee: Simmonds Precision Products, Inc., Vergennes, Vt.

[21] Appl. No.: 09/158,932

[22] Filed: Sep. 22, 1998

[51] Int. Cl.[7] .................................................. H02H 9/00
[52] U.S. Cl. ............................................................ 361/58
[58] Field of Search .................................. 361/93.1, 93.9, 361/39, 40, 41, 54, 56–58, 110, 111, 119, 118

[56] References Cited

U.S. PATENT DOCUMENTS

| | | | |
|---|---|---|---|
| 3,797,311 | 3/1974 | Blanchard et al. ................... | 73/304 C |
| 5,594,329 | 1/1997 | Van Ettinger et al. .................... | 324/96 |
| 5,602,540 | 2/1997 | Spillman, Jr. ....................... | 340/870.37 |
| 5,907,292 | 5/1999 | Ahr ..................................... | 340/870.31 |
| 5,952,849 | 9/1999 | Haigh ........................................ | 326/82 |

Primary Examiner—Ronald W. Leja
Attorney, Agent, or Firm—William E. Zitelli; Renner, Otto, Boisselle & Sklar

[57] ABSTRACT

The present invention includes an aircraft fuel tank protective barrier which includes a transformer. The transformer has a first winding coupled to a fuel tank indicator through wiring which forms a threat side of the barrier, and has a second winding coupled to one or more sensors in a fuel tank which forms a protected side of the barrier. The transformer is operable to magnetically couple normal signals between the fuel tank indicator and the sensors in the fuel tank while limiting an amount of energy delivered to the fuel tank in the event of a fault experienced on the wiring.

23 Claims, 4 Drawing Sheets

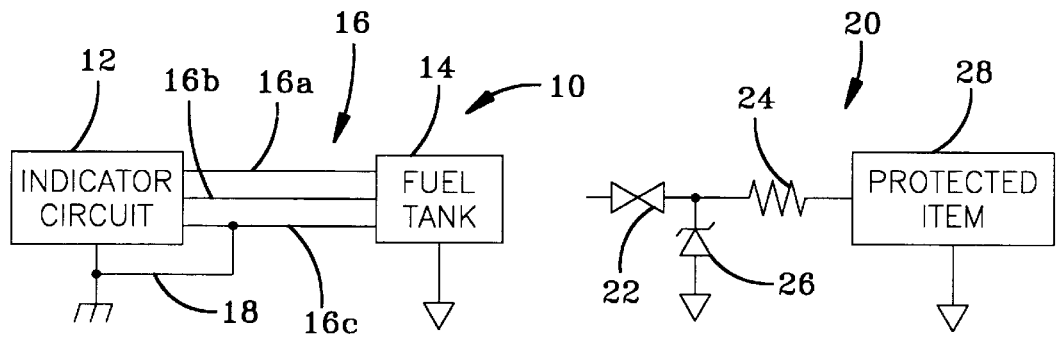
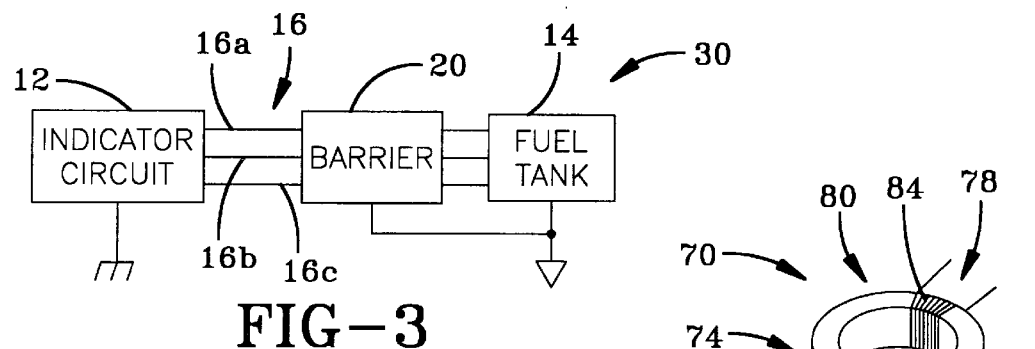
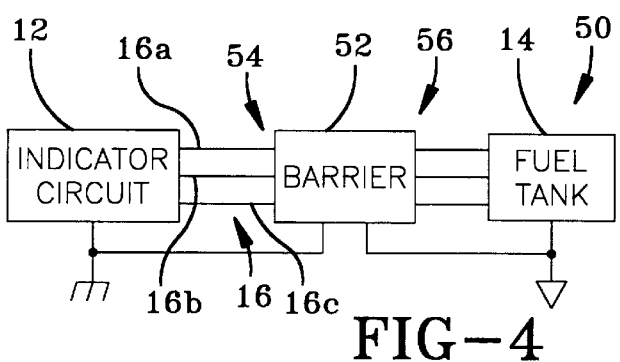
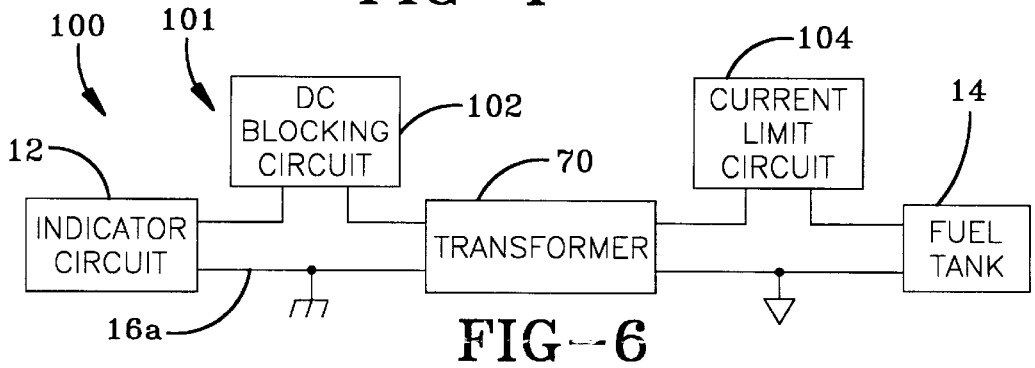

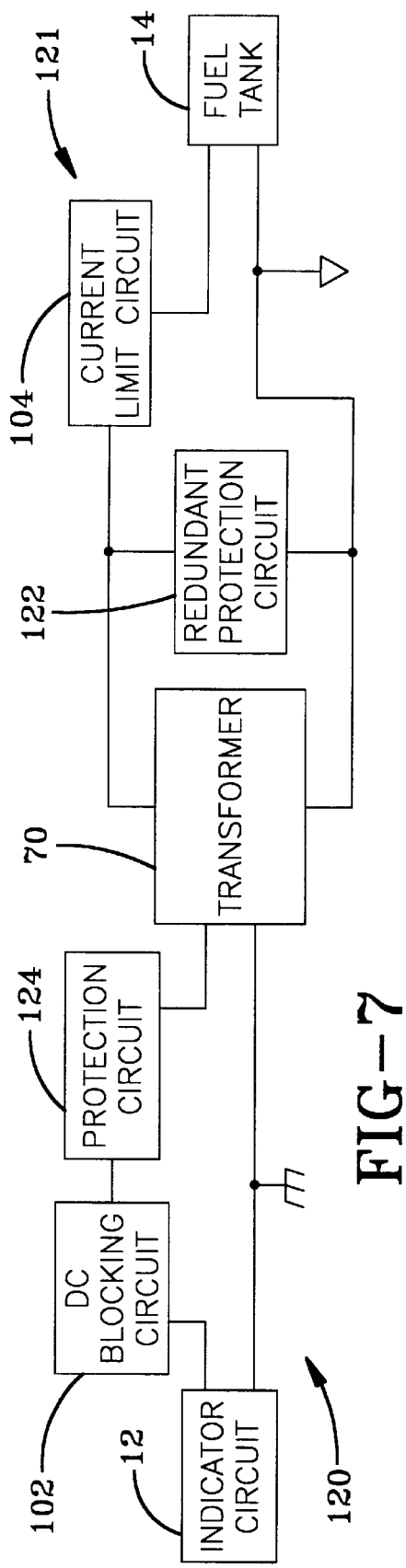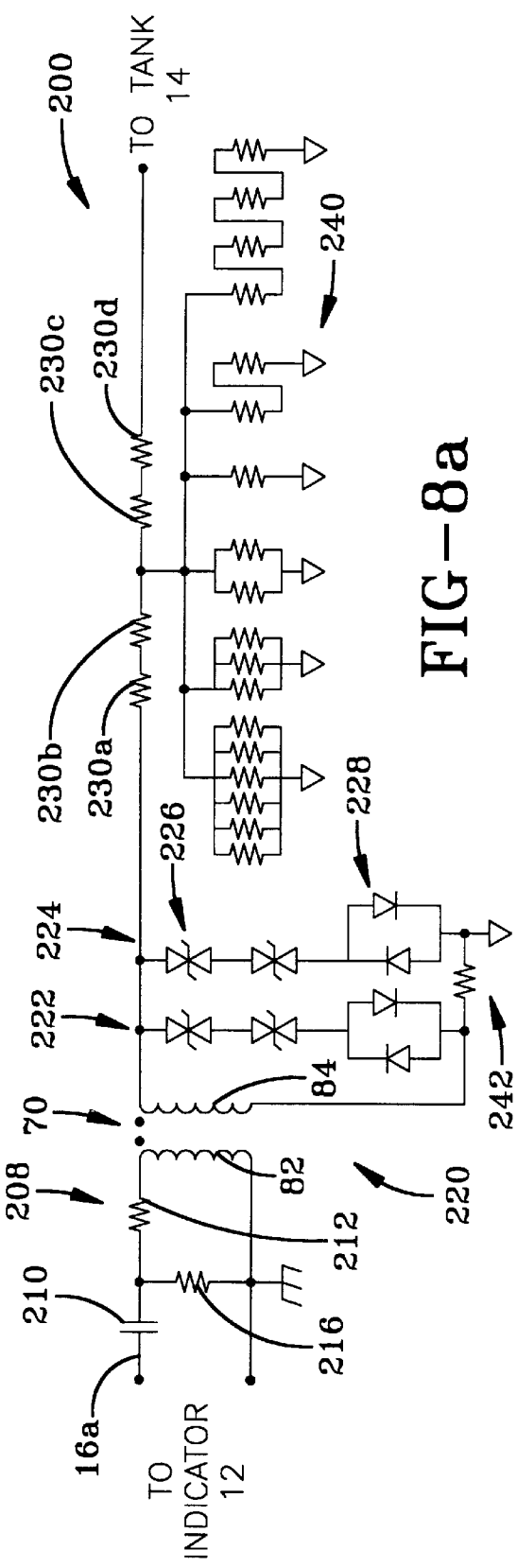

AIRCRAFT FUEL TANK PROTECTIVE BARRIER AND METHOD

FIELD OF THE INVENTION

The present invention relates generally to a protective barrier and method for an aircraft fuel tank and more particularly relates to a barrier which limits the amount of energy transferred to a tank when an aircraft experiences system fault conditions such as power faults or lightning strikes.

BACKGROUND OF THE INVENTION

Fuel gauge systems are utilized within the aircraft industry to determine and monitor the amount of fuel remaining in an aircraft fuel tank. A common form of fuel gauge system is a capacitive type fuel gauge, as illustrated in prior art FIG. 1. The capacitive type fuel gauge, indicated at 10, includes an indicator circuit 12, which is located typically on the flight deck within the cockpit, and a fuel tank 14 which contains one or more sensors (not shown) for ascertaining an amount of fuel therein.

The indicator circuit 12 typically includes processing circuitry and a communication interface to transmit excitation signals (e.g., 10 volt peak, 5 KHz) to the sensors in the tank 14. Typically, two different types of sensors are used within the tank 14, one to sense the dielectric properties of the fuel, and another to identify the location of the fuel within the tank 14. Both of these sensors exhibit excitation responses which are fed back to the indicator circuit 12, wherein the excitation responses are processed to determine the necessary information. The sensors within the tank 14 are coupled to the indicator circuit 12 through three wires 16, wherein two wires 16a and 16b are low impedance lines and couple the input excitation signals from the indicator circuit 12 to the sensors, and a third wire 16c is a high impedance line and carries the return excitation signals from the sensors back to the indicator circuit 12 in a time-multiplexed fashion. The high impedance return line is typically shielded with a shield 18 which is grounded at the indicator circuit 12. The shield 18 is used to prevent capacitive coupling between the low impedance wires 16a and 16b and the high impedance wire 16c. Therefore, the only capacitive coupling in the system 10 occurs at the sensors within the fuel tank 14. Typically, grounding the shield 18 elsewhere causes an inaccurate measurement in the gauge system 10 and therefore moving the location of the ground is undesirable.

Although the prior art fuel gauge system 10 is safe and reliable, it is always desirable to further improve the safety and reliability of systems within aircraft.

SUMMARY OF THE INVENTION

The present invention relates to a protective barrier and method for an aircraft fuel tank which effectively limits the transfer of energy to the fuel tank under a variety of potential system faults. The present invention limits the energy into the fuel tank to a level that is below the minimum ignition energy of an explosive mixture within the fuel tank.

More particularly, the protective barrier and method protect the fuel tank by magnetically coupling the excitation signals of the fuel gauge indicator to the fuel tank. In a preferred embodiment, the magnetic coupling is accomplished using a transformer. The core saturation of the transformer is utilized to limit the energy transfer to the tank during power fault conditions while the common-mode rejection of the transformer is used to block lightning strikes. Thus the barrier of the present invention protects the fuel tank against both types of fault conditions. In addition, the use of a transformer eliminates the grounding problems inherent in the application of a prior art barrier by grounding the primary winding of the transformer to the indicator circuit ground and grounding the secondary winding of the transformer to the fuel tank ground. Consequently, the present invention protects the aircraft fuel tank from excessive energy being transferred thereto while not impacting the fuel gauging system performance.

According to a preferred embodiment of the present invention, the protective barrier and method use a transformer having a toroidal core with a primary winding and a secondary winding thereon. The core design is preferably constructed to limit an energy transfer from the primary winding (the threat side of the barrier) to the secondary winding (the protected side of the barrier) to an energy level which is below the minimum energy level at which an explosion may occur. The protective barrier protects against AC and DC power faults using the saturation of the transformer core. In addition, the DC protection of the transformer may be supplemented with a DC blocking circuit such as a capacitor.

Preferably, the protective barrier and method use redundant protection mechanisms to insure fuel tank protection. Redundant protections include a current limit circuit coupled to the secondary winding of the transformer to prevent current conduction in the secondary winding from exceeding a predetermined level in the event of a transformer malfunction. The barrier also includes transient voltage suppression circuitry coupled to the secondary winding of the transformer to shunt transferred energy to the fuel tank ground in the event of a transformer failure.

In a preferred embodiment, the protective barrier and method use a T-attenuator resistor network coupled to the secondary winding of the transformer to trim the gain of the transformer to a desired value. Consequently, this provides additional assurance that the protective barrier will not impact the normal operation of the fuel gauge system. In addition, the barrier includes a test jumper circuit which allows for portions of the barrier to be easily tested during scheduled maintenance to ensure that the barrier is operating properly.

Although the present invention was conceived and developed for an aircraft fuel tank gauge system and is described chiefly in this context, the principles of the invention in their broader aspects can be adapted to non-aircraft fuel tank applications as well and still other applications where a protective energy barrier may be useful in limiting the transfer of energy via circuitry into an explosive or other environment. The present invention contemplates such other industries and applications.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a block diagram illustrating a prior art capacitive-type fuel gauge system for an aircraft;

FIG. 2 is a circuit diagram illustrating a prior art protective barrier;

FIG. 3 is a block diagram illustrating a capacitive-type fuel gauge system utilizing the protective barrier of prior art FIG. 2;

FIG. 4 is a block diagram illustrating a protective barrier in a capacitive-type fuel gauge system according to the present invention;

FIG. 5 is a perspective view of a transformer having a toroidal core and two windings thereon;

FIG. 6 is a block diagram illustrating exemplary components of the protective barrier of FIG. 4 according to the present invention;

FIG. 7 is a block diagram illustrating another protective barrier according to the present invention;

FIGS. 8a–8c are circuit diagrams illustrating in greater detail a protective barrier according to the present invention.

DETAILED DESCRIPTION OF THE INVENTION

Figure 8B:
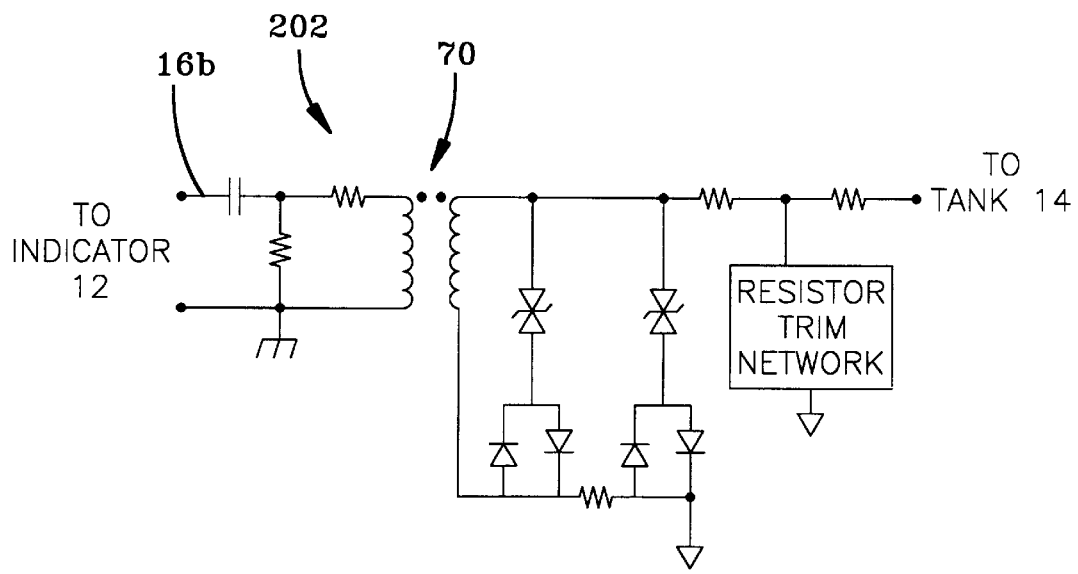

The present invention will now be described with reference to the drawings wherein like reference numerals are used to refer to like elements throughout. The present invention relates to a system and method for protecting an aircraft fuel tank from excessive amounts of energy transferred thereto due to system faults or threats. The system includes a protective barrier which provides magnetic coupling for normal excitation signals from indicator circuitry to sensors within the fuel tank while concurrently limiting or blocking excessive amounts of energy due to diverse system faults such as system power faults or lightning strikes. The present invention preferably uses a transformer to effectuate the magnetic coupling in a normal mode, utilizes the saturation of the transformer core to block AC and DC power faults, and exploits the transformer common-mode rejection functionality to block lightning strikes. Lastly, the barrier preferably includes a DC blocking circuit such as a capacitor as a supplementary DC protection to protect the fuel tank from DC type power faults.

One potential problem with the system 10 of prior art FIG. 1 is that no barrier exists near the fuel tank 14 to limit energy transfer to the fuel tank 14 in the event of a fault such as a power fault or a lightning strike. For example, if the wiring 16 degrades and shorts out to a power line such as a 28 volt DC power line or a 115 volt, 400 Hz AC power line, a fault condition may occur in which the energy delivered to the fuel tank 14 through the wires 16 may be greater than the minimum ignition energy of an explosive mixture within the fuel tank 14. Alternatively, a lightning strike to the aircraft in an instance when the wires 16 have degraded, could cause a similar condition. Such a condition is highly undesirable, and although such a condition is extremely unlikely given proper maintenance of the wires 16, it would be desirable to limit the energy transferred to the fuel tank 14 under such a condition to further improve the safety of the aircraft.

A typical, prior art type barrier 20 used in mining applications, etc., is illustrated in prior art FIG. 2. The barrier 20 includes a fuse 22 in series with a current limiting resistor 24. The barrier 20 also includes a zener diode 26 which is placed in parallel with an item 28 to be protected. The barrier 20 generally operates as follows. The zener diode 26 is a high power zener which shunts fault energy to ground when its zener breakdown voltage is reached. The diode 26 continues to shunt the fault energy to ground until the fuse 22 or a similar device fails (e.g., becomes an open circuit) to terminate the flow of energy transfer by limiting the current to the item 28 when the zener diode 26 is in breakdown. The resistor 24 provides an additional limit to the energy. The barrier 20 requires a high performance ground (e.g., a low resistance) to effectively shunt the large fault currents.

The barrier 20 of prior art FIG. 2 could be implemented within a fuel gauge system such as the system 10 of prior art FIG. 1 to provide a barrier function. A system 30 employing the barrier 20 is illustrated in FIG. 3. The barrier 20 is placed at a point within the system 30 where the fuel quantity wires 16 penetrate the fuel tank 14 and the barrier 20 must be effectively grounded at the point where the wires 16 penetrate the fuel tank 14 to provide the requisite protection. Such a configuration, however, is not an ideal solution. For example, it is at odds with the requirements of the shielded high impedance line which requires it to be grounded to the indicator circuit 12. If the ground for the barrier 20 is moved from the indicator 12 to the fuel tank 14, a noise signal could be injected into the outputs of the indicator 12. The noise may arise from the power currents in the airframe (which serves as a ground) which discourages a connection of the indicator circuit 12 to other systems due to the potential noise injection. Therefore the grounding requirements of the standard barrier 20 and the system gauge are in conflict.

Another problem with the prior art barrier 20 of FIG. 2 is that lightning strikes are considered a normal or common fault condition in aircraft service. Thus, the barrier 20 must be able to withstand a lightning strike without blowing the fuse 22 so that it can be used multiple times, yet still effectively limit the energy into the tank 14. Simultaneously, however, the barrier 20 must be able to quickly fail (i.e., blow the fuse 22) during an uncommon power fault condition which might compromise aircraft safety. The barrier 20, however, is incapable of distinguishing between the two different types of fault conditions. Therefore either one type of fault condition is addressed in an optimized fashion or alternatively, the barrier 20 is constructed with design trade-offs in a compromised fashion to attempt to accommodate adequately both fault conditions.

Yet another potential problem with the barrier 20 of FIG. 3 in aircraft applications occurs during a lightning strike. With a lightning strike, due to the grounding of the barrier 20 at the indicator ground, the barrier 20 will protect the tank 14, but it will do so by clamping the lightning potential to ground which thus transfers or reflects the lightning strike energy back to the indicator circuit 12, thus possibly damaging the indicator circuit 12. Consequently, the system 30 of FIG. 3 will require an additional barrier to be located at the indicator circuit 12 which thus requires additional components and complexity and is undesirable.

Turning now to FIG. 4, a block diagram illustrates a fuel gauge system 50 implementing a barrier 52 according to the present invention. The system 50 includes the indicator circuit 12 and the fuel tank 14 having the sensors located therein (not shown). The barrier 52 of the present invention differs substantially from the standard barrier 20 of prior art FIG. 2 since the barrier 52 of FIG. 4 isolates a threat side 54 of the barrier 52 from a protected side 56 of the barrier 52 and magnetically couples the excitation signals (e.g., 10 volt peak, 5 KHz) between the indicator circuit 12 and the sensors within the fuel tank 14. Because the barrier isolates the protected side 56 from the threat side 54, separate grounds can be utilized at the indicator circuit 12 and the tank 14, as illustrated in FIG. 4. Preferably, the barrier 52 is a transformer, however, other magnetic coupling systems providing a similar function may also be utilized and are contemplated as falling within the scope of the present invention. The barrier 52 is preferably a transformer due to its core saturation and common-mode rejection properties which will be discussed in greater detail infra.

An exemplary transformer 70 is illustrated in FIG. 5. The transformer 70 has a toroidal core 72 which is separated into four sections 74, 76, 78 and 80, respectively. The first and third sections 74 and 78 have primary and secondary windings 82 and 84 thereon, respectively, which wrap around the core, preferably with N turns each. Thus the referred turn ratio $N_{82}/N_{84}$ is 1:1, making the transformer 70 unity gain for use in accurately coupling the excitation and response signals between the indicator circuit 12 and the fuel tank 14. The first and third sections 74 and 78 are preferably separated by the second and fourth sections 76 and 80 of the core 72, thus isolating the primary winding 82 from the secondary winding 84 by one-quarter of the core circumference.

Preferably, the core 72 has an inside diameter of about 0.75 inch, an outside diameter of about 1.5 inches, and a height of about 0.375 inch. In addition, the transformer core 72 is preferably constructed by wrapping a 1 mil thick supermalloy ribbon (e.g., 80% NiFe alloy) around a 0.75 inch dowel until an outside diameter of about 1.5 inches is reached. Although the above core 72 is preferred, alternative cores with various shapes, sizes and materials may be utilized and are contemplated as falling within the scope of the present invention.

The barrier 52 of FIG. 4, when consisting solely of the transformer 70 of FIG. 5, is operable to block the most likely fault condition an aircraft will experience, that is, a lightning strike. Lightning strikes occur frequently and result in a high voltage pulse (e.g., 600V, 120A pulses). If, due to some exceptional circumstance, the lightning strike creates a fault condition on one or more of the lines 16 of the system 50, the fault is experienced as a common mode voltage on the line and thus is equivalent to having identical voltage sources being implied to the power and ground terminals for the line. Since the transformer exhibits common mode rejection functionality (i.e., only conducts when a voltage difference exists across the primary winding 82) a lightning strike is blocked by the transformer 70.

Note that a lightning strike may stress the transformer insulation (such as the core insulation, the windings insulation and the insulating tape often used to protect the windings 82 and 84) and cause dielectric breakdown. Therefore it is preferred that sufficient insulation be utilized in the design of the transformer 70 to insure that the dielectric breakdown voltage of the transformer insulation be greater than the lightning voltage (e.g., a 2KV breakdown rating). Manipulating the dielectric breakdown voltage of the transformer 70 may be easily accomplished by changing the material of the transformer insulation or increasing the amounts of insulation utilized in the transformer 70, as maybe desired.

The barrier 52 of FIG. 4 may also shield the fuel tank 14 from an AC power fault by incorporating a fuse-type element in series with the primary winding 82 of the transformer 70. The AC power used in an aircraft is 115 volt AC, 400 Hz. If, under some exceptional circumstance an AC line power fault condition (e.g., 115 volt AC, 400 Hz) occurs on one of the lines 16 of the fuel gauge system 50, the transformer 70 (which preferably is designed to saturate at a value slightly above normal operating signal voltages, e.g., 11–12 volts) will quickly saturate. Once the core saturates, the primary winding 82 acts like a short circuit and the current conduction through the primary winding 82 will increase dramatically. The rapid current increase will then blow the fusing device and thus block the energy transfer to the secondary winding 84.

Note that during the short time prior to the fuse blowing and causing the open circuit, the transformer 70 is in saturation and energy is being transferred to the secondary winding 84. The transformer 70, however, is preferably designed to saturate at a flux density which results in the transfer of about 10 mJ, which is substantially less than the minimum ignition energy of about 100 mJ. Thus, the AC line power fault doe not threaten the fuel tank 14 due to the protective barrier 52.

As discussed above, the barrier 52 protects the fuel tank from an AC line power fault, however, the protective mechanism results in damage to the system 50 since the fuse is blown. This situation, although not desirable, is acceptable because an AC line power fault is considered an extremely rare fault condition. Therefore it is acceptable to replace the barrier 52 with a new barrier if such a fault condition occurs. Conversely, lightning strikes, as discussed above, are common and thus the chance of a fault due to a lightning strike, although very small, is still much greater than a line voltage fault. It is thus desirable that the barrier 52 effectively blocks such faults without damage to the barrier 52. The barrier 52 of the present invention, due to the common-mode rejection and core saturation characteristics of the transformer 70, effectively differentiates between the diverse fault conditions by taking appropriate action to block or limit the energy transfer to the fuel tank 14 via different mechanisms.

Referring now to FIG. 6, a preferred exemplary system 50 is designated by reference numerals 100 and 101. The system 100 of FIG. 6 operates in a manner similar to the system 50 of FIG. 4 to the extent that the transformer 70 and the fuse operate to block or limit the energy transferred to the tank 14 due to AC line power faults and lightning strikes via the core saturation and common-mode rejection characteristics of the transformer 70. In addition to the above characteristics, the system 100 includes a DC blocking circuit 102 coupled to the primary winding 82 of the transformer 70 and a current limit circuit 104 coupled to the secondary winding 84 of the transformer 70. Note that in FIG. 6, only one of the wires 16a is illustrated for the sake of simplicity. It should be understood, however, that the barrier mechanism 101 illustrated in FIG. 6 is preferably applied into each of the wires 16a, 16b, and 16c and thus a preferred barrier employs three transformer barriers similar to that illustrated in system 100.

The DC blocking circuit 102 is employed to block or limit the amount of energy which is transferred to the fuel tank 14 in the event of a DC power fault. As is well known by those skilled in the art, aircraft deploy a 28 volt DC battery for power (primarily for back-up power). In the unlikely event of a fault condition where 28 volt DC is placed on one of the wires 16 going to the fuel tank 14, the DC blocking circuit 102 preferably behaves as an open circuit and prevents the primary winding 82 of the transformer 70 from conducting current therethrough. Therefore a DC line fault is blocked by the barrier 101. Preferably, the DC blocking circuit 102 is a capacitor which acts like an open circuit for DC voltages. Alternatively, however, other DC type blocking circuits or mechanisms may be utilized and each such system or mechanism is contemplated as falling within the scope of the present invention.

Note that at the moment in which the a DC power fault occurs, the voltage on the line 16 quickly changes from its typical value to 28 volt DC. Since the DC blocking circuit 102 acts as an open circuit for DC voltages, the voltage transition to 28 volts will pass through the blocking circuit 102 to the transformer 70, after which the blocking circuit 102 will effectively become an open circuit. The current conduction during the transition to the DC voltage will induce a voltage across the primary winding and the fault will couple to the secondary winding 84. The coupled fault, however, will be limited by the saturation of the core transformer. In addition, the current induced in the secondary winding 84 during this short time interval will be limited to a safe level (e.g., less than about 150 mA) by the current limit circuit 104. Thus the DC fault condition does not adversely impact the fuel tank 14 due to the protective barrier 101 of FIG. 6. Preferably, the current limit circuit 104 is one or more resistors. Alternatively, however, other circuits, circuit devices and mechanisms may be utilized to limit the current to the tank 14 to a safe level and such devices are contemplated as falling within the scope of the present invention. Although the operation of the current limit circuit 104 is discussed above in conjunction with the DC fault condition, the circuit 104 is equally applicable to all the fault conditions.

In the above description of FIG. 6, a DC blocking circuit 102 is preferably used to limit the energy transferred to the tank 14 under a DC fault condition. Although the DC blocking circuit 102 is preferred since the barrier 101 survives the DC fault condition, the transformer 70 itself can alternatively be utilized in conjunction with a fusing element to block the DC fault. In such an alternative mode, when a DC fault occurs at the primary winding 82 of the transformer 70, the core 72 saturates and the current in the winding 82 increases dramatically. The increase in current stresses the fusing element, thus causing it to blow open and block the energy transfer.

As discussed above in conjunction with FIGS. 4 and 6, the protective barrier of the present invention protects the fuel tank 14 by blocking or limiting energy transfers to the tank 14 caused by a variety of system faults which may occur on the lines 16 to the tank 14. Such diverse faults conditions may include AC and DC power faults or lightning strikes. The protective barrier is effective in protecting against such faults due to the characteristics of the transformer within the barrier. Each of the features discussed in FIGS. 4 and 6 may be combined together, as illustrated in FIG. 7. In addition, in order to provide redundancy in the protective barrier, a system 120 of FIG. 7 contains a barrier 121 which further includes a redundancy protection circuit 122 which serves to protect the fuel tank 14 in the event of a malfunction of the transformer 70. A discussion of the system 120 follows below.

The system 120 includes the transformer 70, the DC blocking circuit 102 and the current limit circuit 104. The system 120 also includes a protection circuit 124 which, is discussed briefly supra, may operate as a fuse during core saturation. Note that although the protection circuit 124 may be a fuse which blows open or a resistor that blows open upon being thermally stressed, the circuit 124 may alternatively be other types of circuits or devices which do not open in a destructive manner. For example, the circuit 124 may include a thermal or voltage/current magnitude-activated relay which opens at a specified rating to protect the transformer 70 from overheating to protect the fuel tank 14. In another alternative, a switching circuit using transistor-type switches may monitor the current in the primary winding 82 or the voltage across the primary winding 82 and open the circuit when a predetermined condition is met. In addition, other types of protection mechanisms may be utilized and each such circuit is contemplated as falling within the scope of the present invention.

The redundant protection circuit 122 of FIG. 7 preferably includes one or more parallel diode zener stacks which operate to shunt the energy to the fuel tank 14. The zener stack generally acts as an open circuit until a voltage exceeding its rated zener voltage ($V_Z$) is reached. Since the standard excitation signals from the indicator circuit 12 are 10 volt peak, the redundant protection circuit 122 preferably is not active unless the voltage to the fuel tank 14 exceeds 10 volts. Thus, the zener stack is preferably designed to conduct (i.e., break down) at a voltage across the secondary winding 84 of about 10–15 volts. Alternatively, however, the breakdown voltage could be varied, for example, between 10–50 volts or more depending on the particulars of the system. Such variations are contemplated as falling within the scope of the present invention.

Note that the protection circuit 122 will generally not be operating because the transformer 70 will act to block or limit the energy to the tank 14 in the event of a fault condition. Therefore the protection circuit 122 is a redundant protection device which serves as an additional safeguard in the event of a transformer malfunction or an unexpected fault signal which passes through the transformer 70. In addition, the protection circuit 122 absorbs any excessive energy from the transformer 70 and does not rely on a ground connection to provide its function. Thus in the present invention, the redundant protection circuit 122, which operates traditionally to absorb any excess energy from the transformer 70, does not require a high performance ground like the barrier of FIG. 3, yet allows grounding of the protected side of the barrier at the tank 14 without adversely impacting the operation of the indicator circuit 12. In conjunction with the redundant protection circuit 122, the current limiting circuit 104 acts to limit the current to the fuel tank 14 to a safe value (e.g., less than 150 mA) at the breakdown voltage of the protection circuit 122.

Figure 8C:
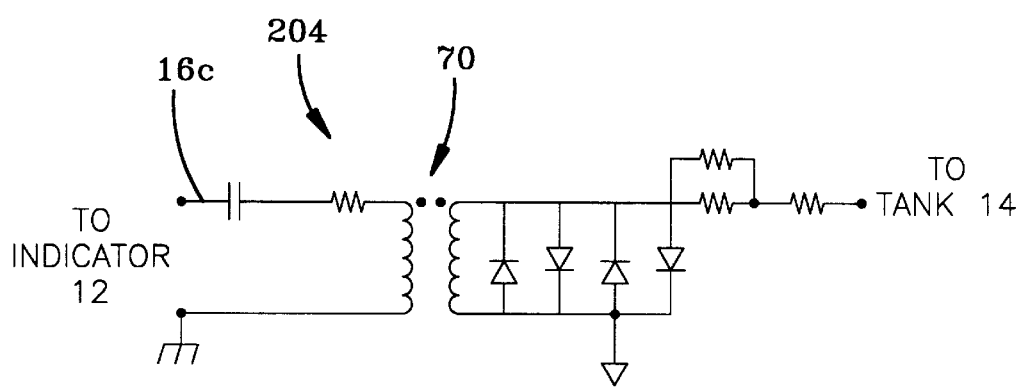

FIGS. 8a–8c are exemplary barrier circuits which implement the principles described above in greater detail. In FIG. 8a, a barrier circuit 200 is used to protect the line 16a, a low impedance line which couples the excitation signal to the sensor within the fuel tank 14, and which measures the dielectric properties of the fuel. FIG. 8b illustrates a barrier circuit 202 which protects the line 16b, which is a low impedance line which couples excitation signals to the sensor within the fuel tank 14, and which identifies the location of the fuel within the tank 14. Lastly, FIG. 8c illustrates a barrier circuit 204 which protects the line 16c, which is a high impedance line which returns the signals from the sensor within the fuel tank 14 to the indicator circuit 12 in a time-multiplexed fashion.

Turning to FIG. 8a, the barrier 200 includes on the input or the threat side 208 of the transformer 70 a blocking capacitor 210 (e.g., 1 $\mu$F) which serves to block DC faults from inducing current in the primary winding 82 of the transformer 70. A resistor 212 (e.g., about 20 ohms, and about 0.1 W power rating) is couples in series with the capacitor 210 and serves as a fuse in the event of saturation in the transformer core. The resistor 212, upon conduction of current above a predetermined amount (e.g., about 0.2 A) becomes thermally stressed and becomes an open circuit, thus blocking the energy transfer to the tank 14. The remaining resistor 216 is used to dampen any resonant peak due to the transformer leakage inductance. The resistor 216 is optional in the barrier and may be eliminated if desired.

On the protective side 220 of the transformer 70, a pair of diode stacks 222 and 224 are coupled in parallel with the secondary winding 84 of the transformer 70. The stacks 222 and 224 include transient voltage suppressor diodes (e.g., SMCJ50CA) 226 in series with a pair of high current diodes 228 (e.g., 1N5811). The stacks 222 and 224 act as the redundant protection circuit 122 of FIG. 7 and are not activated unless the transformer 70 malfunctions. The diode stacks 222 and 224 are non-conducting when normal excitation signals are magnetically coupled through the windings 82 and 84. If the transformer 70 fails, however, and a fault condition occurs, then the stacks 222 and 224 will limit the voltage across the secondary winding 84 to their breakdown value, regardless of the source of the fault. In addition, a plurality of series connected resistors 230*a*–230*d* limit the current to the fuel tank 14 to a safe level (e.g., less than 150 mA) when the stacks 222 and 224 are in breakdown.

The high current diodes 228 are preferably coupled in series with the transient voltage suppressor diodes 226 and provide a small capacitance (e.g., about 200 pF) in series with the larger capacitance of the suppression diodes 226 (e.g., about 12 nF). The total result of the series-coupled capacitance is thus less than the capacitance of the diodes 228, which insures that the resonance of the transformer leakage inductance with the barrier capacitive loads (the sensors) is more than a decade in frequency above the system operating frequency (e.g., about 5 KHz) and thus will cause no negative impact on the normal system operation.

The barrier circuit 200 of FIG. 8*a* also includes a resistor trim network 240 which forms a T-attenuator with the resistors 230*a*–230*d*. When designing transformers, it is difficult to control the number of turns to exact values, thus making it difficult to achieve a unity gain transformer. Since it is desirable for the barrier circuit 200 to have no discernable impact on the normal operation of the gauge system, the resistor network 240 may be trimmed to unity gain. The resistor network 240 is preferably composed of film-type resistors which form the vertical element of the "T" in the T-attenuator. By trimming the network 240 for example, by laser trimming or use of hot tweezers, the attenuation of the network 240 can be trimmed and the barrier circuit 200 can be calibrated to have no impact on the fuel measurement.

The circuit 200 further includes a test jumper 242 between the diode stacks 222 and 224, which is preferably a removable resistor. The test jumper 242 allows a technician to open the circuit 200 and test each stack 222 and 224 individually to insure that the redundant protection circuit is fully operational.

As seen from FIGS. 8*a*–8*c*, the barrier circuits 200, 202 and 204 differ from one another, respectively. The difference in the barrier circuits is due to the different system requirements for the wires 16*a*–16*c* for which the barriers are designed to protect. For example, the wire 16*a* corresponds to the compensator for the fuel gauge and transmits a 10 volt peak signal during normal operation. The barrier circuit 200 thus preferably utilizes a transformer which saturates at a voltage slightly greater than 10 volts. In addition, the redundant protection circuitry is preferably greater than the normal 10 volt operating voltage.

The wire 16*b* corresponds to the tank unit for the fuel gauge and transmits a 0.7–4.0 volt peak signal under normal operating conditions. Therefore the transformer may be modified to saturate at a lower voltage (e.g., about 5–10 volts) and the redundant protection circuitry can be modified to have a lower breakdown voltage. Similarly, the wire 16*c* transmits voltages in the range of about 1 mV and thus the barrier circuit 204, as illustrated in FIG. 8*c*, can be modified accordingly. For example, the transformer may be a current transformer and be designed to saturate at low voltages. In addition, the breakdown voltage of the redundant protection circuitry need only be about 0.5 volts. The circuits 200, 202 and 204 thus illustrate that a variety of circuit implementations may be utilized to implement the present invention as may be desired in different type systems. Each such variation is contemplated as falling within the scope of the present invention.

Figure 9:
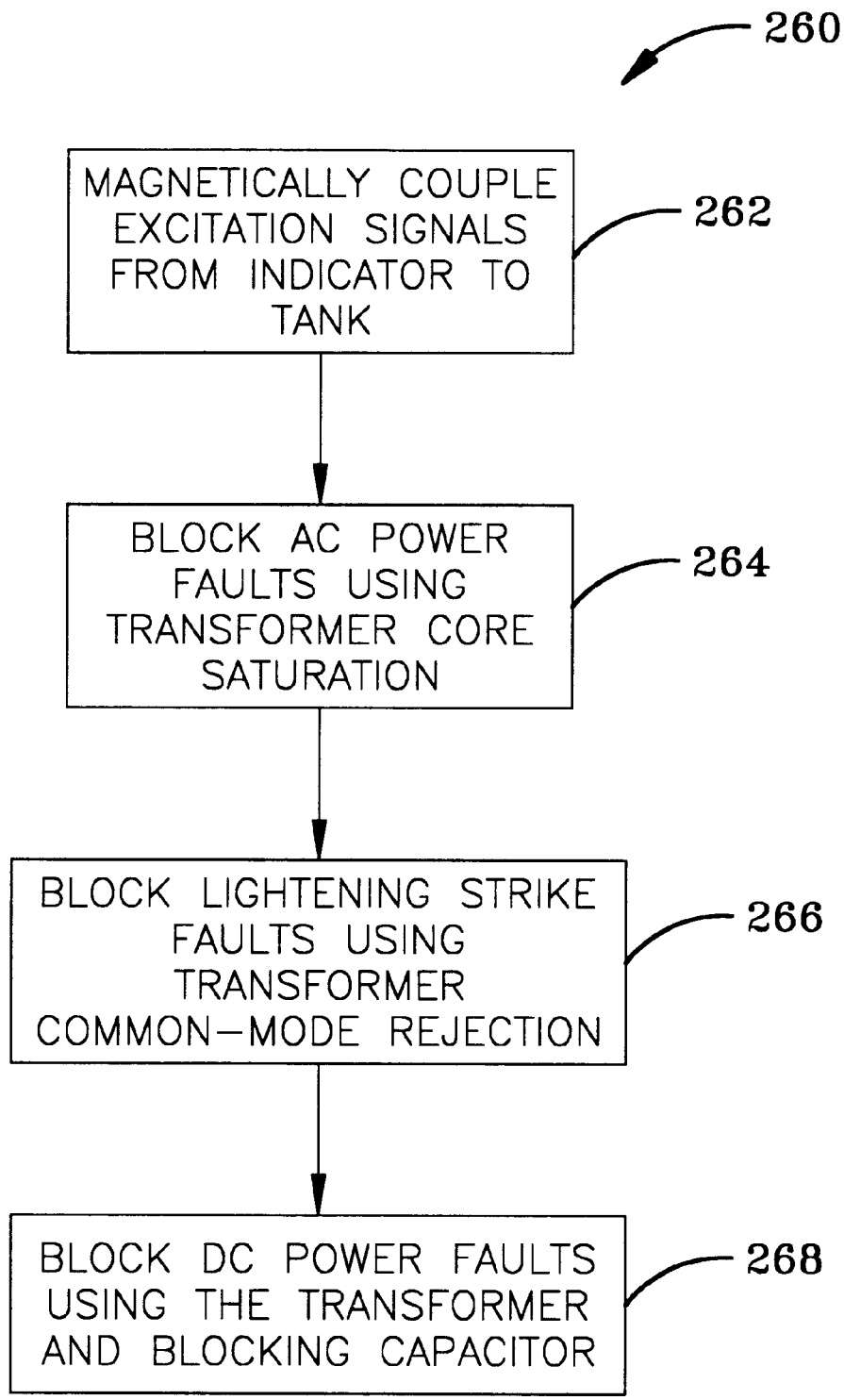
FIG. 9 is a flow chart diagram illustrating a method of protecting a fuel tank according to the present invention.

The present invention has been discussed above in the context of a system, however, the invention also contemplates a method of protecting a fuel tank from faults which may occur on fuel gauge wiring. The methodology of the present invention should be apparent from the foregoing description of the barrier system. However, the methodology may be summarized in conjunction with FIG. 9. In FIG. 9, a method 260 for effectuating such protection is illustrated in the context of a flow chart. The method 260 includes the magnetic coupling (e.g., using a transformer) of excitation signals from the fuel gauge indication circuitry to the sensors within the fuel tank at step 262. The magnetic coupling step allows for the electrical isolation of the indicator circuitry and the sensors within the fuel tank which facilitates the limiting of energy transferred to the tank due to a fault condition. In addition, the present invention allows the use of multiple ground points (e.g., indicator ground and fuel tank ground) without impacting the gauge operation.

The method 260 also includes blocking of an AC power fault using the transformer core saturation characteristic at step 264. Various mechanisms and/or circuits may be utilized to monitor the core for saturation and take appropriate action in response thereto to prevent a large energy transfer to the fuel tank. For example, a fuse may be utilized in series with the primary winding of the transformer. The method 260 further includes the blocking of faults due to a lightning strike at step 266 by utilizing the common-mode rejection characteristic of the transformer. Lastly, the tank is protected against DC power faults at step 268, preferably by supplementing the transformer with a DC blocking circuit such as a capacitor to decouple the magnetic circuit when a DC fault is protected. Alternatively, however, the transformer may provide protection utilizing its core saturation characteristic in conjunction with a fusing element.

Although the invention has been shown and described with respect to a certain preferred embodiment or embodiments, it is obvious that equivalent alternations and modifications will occur to others skilled in the art upon the reading and understanding of this specification and the annexed drawings. In particular regard to the various functions performed by the above described components (assemblies, devices, compositions, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments, as may be desired and advantageous for any given or particular application.

What is claimed is:

1. An aircraft fuel tank protective barrier, comprising a transformer having a first winding for coupling to a fuel tank indicator through wiring and forming a threat side of the barrier, and a second winding for coupling to one or more sensors in a fuel tank and forming a protected side of the barrier, wherein the transformer limits an amount of energy delivered to the fuel tank in the event of a fault experienced on the wiring; and further comprising a redundant protection circuit coupled across the second winding of the transformer on the protected side of the barrier, wherein the redundant protection circuit shunts energy to a ground during the fault in an event of a failure in the transformer.

2. The barrier of claim 1, wherein the fault comprises one of a DC power fault, an AC power fault, and a lightning strike.

3. The barrier of claim 1, in combination with the fuel tank indicator and tank, wherein a ground on the threat side of the barrier is coupled to a ground of the fuel tank indicator, and a ground on the protected side of the barrier is coupled to a ground of the fuel tank.

4. The barrier of claim 3, wherein the ground of the fuel tank comprises a ground near a location where wires that couple to the one or more sensors penetrate the fuel tank.

5. The barrier of claim 1, further comprising a DC blocking circuit coupled to the first winding of the transformer, wherein the DC blocking circuit prevents current conduction in the transformer when a DC fault condition occurs.

6. The barrier of claim 5, wherein the DC blocking circuit comprises a capacitor.

7. The barrier of claim 1, further comprising a current limit circuit coupled to the second winding of the transformer, wherein the current limit circuit prevents a current having a magnitude greater than a predetermined value from entering the fuel tank.

8. The barrier of claim 7, wherein the current limit circuit comprises one or more resistors.

9. The barrier of claim 1, wherein the transformer comprises insulation associated therewith, and wherein the insulation has a dielectric breakdown value which is greater than a lightning strike voltage, thus ensuring that energy is not transferred to the protected side of the barrier via dielectric breakdown.

10. The barrier of claim 1, wherein the first winding and the second winding have a number of turns which are equal to one another, thus making the transformer a unity gain transformer.

11. The barrier of claim 1, further comprising a gain trimming circuit coupled to the second winding for trimming a gain of the transformer to a predetermined level.

12. The barrier of claim 11, wherein the gain trimming circuit comprises a T-attenuator resistor network.

13. The barrier of claim 1, further comprising a protection circuit coupled to the first winding of the transformer, wherein the protection circuit behaves as an open circuit when a core of the transformer saturates, thus limiting an amount of energy transferred to the fuel tank.

14. The barrier of claim 13, wherein the protection circuit comprises a fuse.

15. The barrier of claim 13, wherein the protection circuit comprises a resistor which becomes an open circuit due to thermal over-stress when the transformer core saturates.

16. The barrier of claim 1, wherein the redundant protection circuit comprises one or more suppression diodes for clamping voltages on the second winding and shunting energy away from the fuel tank.

17. The barrier of claim 1, in combination with the tank, wherein the barrier is coupled to the one or more sensors by wires penetrating the fuel tank, and the barrier is located at the place where the wires penetrate the fuel tank.

18. An aircraft fuel tank protective barrier, comprising a transformer having a first winding for coupling to a fuel tank indicator through wiring and forming a threat side of the barrier, and a second winding for coupling to one or more sensors in a fuel tank and forming a protected side of the barrier, wherein the transformer limits an amount of energy delivered to the fuel tank in the event of a fault experienced on the wiring, wherein the transformer comprises a toroidal core having four sections, and wherein the first and second windings are located on the first and third sections, respectively, and are separated by the second and fourth sections.

19. An aircraft fuel gauge system having a fuel tank protective barrier for limiting an amount of energy to a fuel tank to a level below the minimum ignition energy of an explosive mixture in the fuel tank, comprising:

a fuel tank indicator for sending signals to one or more sensors in the fuel tank and receiving return signals from the one or more sensors, wherein the fuel tank indicator determines an amount of fuel in the tank using the return signals, and wherein the fuel tank indicator is positioned at a location remote from the tank;

the fuel tank containing the one or more sensors, wherein the signals are received from the fuel tank indicator and response signals are returned to the fuel tank indicator from the one or more sensors; and the protective barrier is coupled between the fuel tank indicator and the fuel tank via wires for carrying the signals, wherein the protective barrier is located in close proximity to the tank and comprises:

a transformer having a first winding coupled to the fuel tank indicator through at least one of the wires and forming a threat side of the barrier, and a second winding coupled to at least one of the sensors in the fuel tank and forming a protected side of the barrier, wherein the transformer limits an amount of energy delivered to the fuel tank in the event of a fault experienced on the wiring, and wherein the first winding has a around terminal coupled to a ground of the fuel tank indicator remote from the tank.

20. A method of limiting energy transfer to an aircraft fuel tank to a safe level due to wiring used for transmitting signals to and from the fuel tank in a fuel tank gauge system, comprising the step of blocking lightning strikes using a common-mode rejection characteristic of a transformer without blowing a fuse.

21. The method of claim 20, further comprising the step of blocking DC faults using a blocking capacitor.

22. An enclosure, an indicator located remotely from the enclosure and a protective barrier proximate the enclosure, comprising a transformer having a first winding for coupling to circuitry on a threat side of the enclosure, and a second winding for coupling to circuitry on a protected side of the enclosure, wherein the transformer limits an amount of energy transferred from the threat side to the protected side of the barrier in the event of a fault experienced on the threat side of the enclosure, and wherein the first winding is coupled to the indicator by one or more wires which are isolated from ground except at the indicator.

23. A protective barrier for coupling between an indicator and one or more sensors in an enclosure, wherein the barrier limits an amount of energy delivered to the enclosure in the event of a fault experienced on wiring between the indicator and the barrier, and wherein the protective barrier comprises a transformer having a first winding for coupling to the indicator through the wiring and forming a threat side of the barrier, and a second winding for coupling to the one or more sensors in the enclosure and forming a protected side of the barrier, wherein the transformer limits the amount of energy delivered to the enclosure in the event of a fault experienced on the wiring; and further comprising a redundant protection circuit coupled across the second winding of the transformer on the protected side of the barrier, wherein the redundant protection circuit shunts energy to a ground during the fault in an event of a failure in the transformer.

* * * * *